United States Patent

[11] 3,609,386

| | | |
|---|---|---|
| [72] | Inventor | Alvin M. Patlach<br>San Jose, Calif. |
| [21] | Appl. No. | 837,626 |
| [22] | Filed | June 30, 1969 |
| [45] | Patented | Sept. 28, 1971 |
| [73] | Assignee | International Business Machines Corporation<br>Armonk, N.Y. |

[54] APPARATUS FOR PROVIDING UNINTERRUPTED POWER TO A LOAD
16 Claims, 1 Drawing Fig.

[52] U.S. Cl. .................................................. 307/66
[51] Int. Cl. .................................................. H01f 1/00
[50] Field of Search .................................... 307/64, 65, 66, 87, 86, 85, 43, 52, 53, 54, 60

[56] References Cited
UNITED STATES PATENTS

| 3,049,623 | 8/1962 | Du Vall ........................ | 307/66 |
| 3,267,288 | 8/1966 | Maiden et al. .................. | 307/66 |
| 3,418,487 | 12/1968 | Livingston ..................... | 307/66 |
| 3,454,781 | 7/1969 | Scholler ....................... | 307/66 |

*Primary Examiner*—Herman J. Hohauser
*Attorneys*—Hanifin and Jancin and T. J. Kilgannon, Jr.

ABSTRACT: Apparatus for switching power sources to a load without interruption is disclosed. The apparatus includes a source of rectified and filtered AC, a regulator, and a load. The AC source feeds DC power of given voltage to two terminals. A sensing and power delivery circuit is connected to these same two terminals to provide power from a DC source when the power from the AC mains suffers a degradation. The sensing and power delivery circuit includes a saturable switching transistor which switches the battery across the above-mentioned two terminals when a sensing circuit detects a change in the rectified and filtered AC. The sensing circuit controls a controlled rectifier which closes a current path around the battery permitting the switching transistor to saturate thereby effectively placing the DC source across the load terminals. A battery charging arrangement is also shown.

PATENTED SEP28 1971
3,609,386
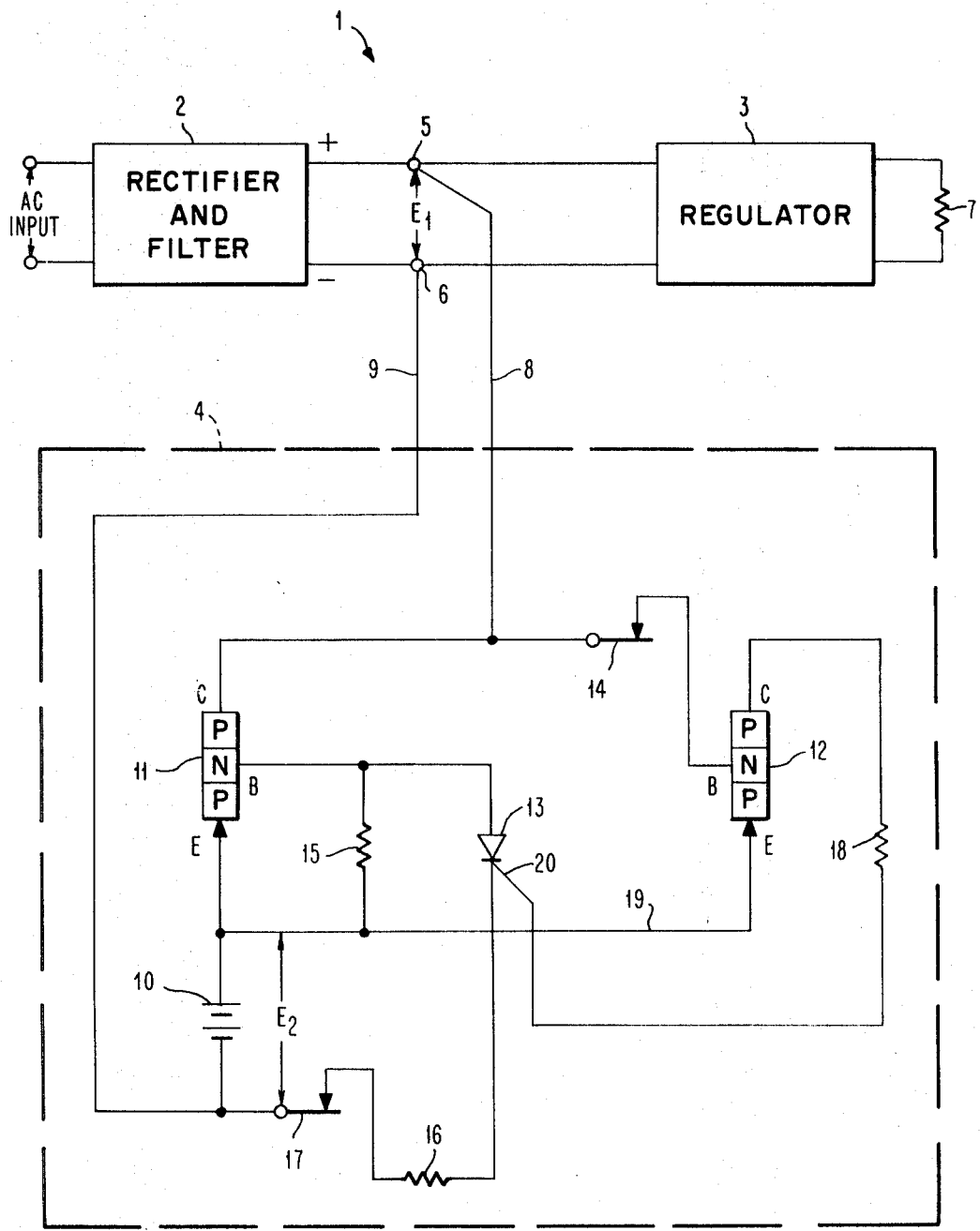
INVENTOR
ALVIN M. PATLACH
BY Thomas J. Kilgannon Jr.
ATTORNEY

APPARATUS FOR PROVIDING UNINTERRUPTED POWER TO A LOAD

BACKGROUND OF THE INVENTION

1. Field of the Invention

This invention relates generally to apparatus for applying electrical power to a load when power supplied from the commercially available AC mains is disturbed or interrupted. More specifically, it relates to apparatus for switching power sources to a load without interruption which incorporates sensing means for detecting a change in power and saturable switching means for applying a battery across the terminals of a load. The saturable and switching means are transistors which, in conjunction with a silicon controlled rectifier, switch a battery across a load when DC power from a rectifier and filter arrangement fails or is momentarily interrupted. Actuable switches in the base circuits of the transistors remove the battery from the load when normal power returns and because only base currents are involved, large relay contacts are not required. The circuit involved in capable of operating in hundreds of nanoseconds so that the load, in effect, never experiences a variation in voltage or power.

2. Description of the Prior Art

In providing power to computers or other devices requiring DC, AC rectifier/filter combinations followed by regulators are often used. If the nature of the load is such that power interruptions are not permissible, an auxiliary energy system must be provided. If the auxiliary energy is from batteries some means must be provided for switching them in and out of the load circuit rapidly. Known auxiliary power supply arrangements incorporate transistors and diodes or portions thereof in series with the load at all times and a switch disposed in series with an auxiliary battery and another portion of the same transistor. In such arrangements where the switch is in series with the load, large contacts are required to carry the load current and rapid switching is not a requirement. Other known arrangements utilize combinations of transistors, resistors and potentiometers all of which are in parallel with the AC rectifier and filter. Most of the known arrangements are useful with the usual load devices where momentary perturbations in power can be tolerated. However, where the load device includes such elements as the memory of computers which may lose their information if power is lost for intervals as short as tenths of microseconds, the usual auxiliary power switching schemes are not acceptable.

SUMMARY OF THE INVENTION

The present invention, in its broadest aspect consists of a battery, saturable switching means, sensing means for detecting a variation in voltage from a given level, and means responsive to the sensing means connected to the saturable switching means and to the battery for connecting the battery across the load terminals when the voltage from a rectifier and filter arrangement falls below a given value. The arrangement is a fast acting, two-terminal circuit which provides for sensing and delivery of auxiliary DC power through the same two terminals. In accordance with a more specific aspect of the invention, apparatus for switching power sources to a load without interruption is provided which includes a battery serially connected with a saturable switching transistor connected to terminals to which the output of an AC rectifier and filter arrangement is also connected. A sensing transistor which detects a variation in the rectified and filtered AC is connected across the saturable switching transistor. The output of the sensing transistor controls and conducting condition of a silicon controlled rectifier, for example, and provides a current path through the battery which saturates the switching transistor thereby applying the battery potential to the same two terminals which are fed by the rectifier and filter arrangement. The arrangement also provides a latching action which prevents spurious or multiple actuation when "flickering" at the AC mains occurs. In addition, switches are placed in the base circuits of each of the switching and sensing transistors to remove power when desired. In each instance, only base current is sent through each contact eliminating the need for high current relays and large contacts which are normally required or as might be required if a diode alone were used since full load current must be interrupted. Then the rectifier and filter arrangement supplies power to the load current must be interrupted. When the rectifier and filter arrangement supplies power to the load, what is normally the collector base PN-junction of the saturable switching transistor becomes a base emitter PN-junction which is capable of passing current. Concurrently, the emitter/base junction appears as the collector/base. The current flowing through a high resistance provides the base current to the transistor in its inverted condition which in turn provides a trickle charge maintaining the battery at the desired voltage level when not in use, while also preventing excessive charging by acting as a constant current source.

It is, therefore, an object of the invention to provide a circuit arrangement for witching power sources without interruption in which sensing and power delivery are accomplished via a two-terminal device.

Another object is to provide a circuit so arranged that a single battery both saturates the switching transistor and provides power to the load.

Still another object is to provide an arrangement for switching power sources without interruption which is fast acting and produces no effect on the primary power source before the auxiliary system is activated.

Still another object is to provide with the same components, a charging technique which protects the storage battery used as an auxiliary power source from excessive charging current.

The foregoing and other objects, features and advantages of the present invention will be apparent from the following more particular description of a preferred embodiment of the invention as illustrated in the accompanying drawings.

BRIEF DESCRIPTION OF THE DRAWING

The sole FIGURE is a partial-schematic, partial-block diagram of a circuit arrangement for switching an auxiliary power supply across a load when power from the usual AC mains fails or suffers a power variation of duration sufficient to affect the load which may include computer memories and the like. The circuit is a two terminal arrangement which includes a battery, a sensing circuit and switching means for applying a battery to a load.

DESCRIPTION OF A PREFERRED EMBODIMENT

Referring now to the sole figure, a power supply system 1 consisting of a rectifier and filter arrangement 2, a voltage regulator 3, and an auxiliary power source, contained within dotted box 4, is shown. Rectifier and filter arrangement 2 is fed from the usual AC mains which in the drawing are designated as AC input. Rectifier and filter arrangement 2 provides a desired value of DC voltage designated E1 across terminals 5 and 6. Rectifier and filter arrangement 2 may be any one of a number of devices well known known those skilled in the power conversion art. The rectifier portion of arrangement 2 may be a simple full wave bridge rectifier disposed in parallel relationship with an electrolytic capacitor which acts as the filter portion of arrangement 2. The output of rectifier and filter arrangement 2 is provided to voltage regulators 3 which, in turn, provides a constant value of DC voltage across a load which is schematically shown in the sole figure as a resistor 7. Regulator 3 may be any one of a number of circuits well known to those skilled in the power conversion art.

Dotted block 4 which contains an auxiliary power source is connected across terminals 5 and 6 by means of leads 8 and 9, respectively, and, when the AC input ceases, flickers, or for any other reason, E1 falls below the voltage E2, the battery potential of the auxiliary power source 4 provides the energy to permit the continuous functioning of regulator 3.

The auxiliary power source contained in dotted box 4 consists of a rechargeable battery 10, a saturable switching transistor 11, a sensing transistor 12, and a silicon controlled rectifier 13 arranged to respond to a change in voltage from sensing transistor 12 so as to connect battery 10 across terminals 5 and 6 without load resistor 7 experiencing any variation in voltage.

The negative terminal of battery 10 is connected to terminal 6 via lead 9. The positive terminal of battery 10 is connected to the emitter of saturable switching transistor 11 which, in the arrangement shown, is a PNP transistor. The collector of switching transistor 11, is connected via lead 8 to terminal 5, and via a normally closed switch 14, to the base of sensing transistor 12 which, in the arrangement shown, is a PNP transistor. The emitter of sensing transistor 12 is directly connected to the emitter of switching transistor 11. The base of switching transistor 11 is connected to its emitter via resistor 15, about which more will be said in what follows. The base of switching transistor 11 is also connected to silicon controlled rectifier 13 and from thence via resistor 16 and normally closed switch 17 to the negative terminal of battery 10. The control electrode of silicon controlled rectifier 13 is connected via a resistor 18 to the collector of sensing transistor 12. When rectifier and filter arrangement 2 is providing a voltage E1 across terminals 5 and 6, a positive voltage equal to E1 across terminals 5 and 6, a positive voltage equal to E1 is applied from terminal 5 via lead 8 and switch 14 to the base of sensing transistor 12. At the same time, the emitter of sensing transistor 12 is connected via lead 19 to the positive terminal of battery 10. The voltage E2 of battery 10, is arranged to be less than or equal to E1 under normal conditions. Under these circumstances, transistor 12 is nonconducting since its base is more positive than its emitter and current does not flow in its collector circuit. However, should the output of rectifier and filter 2 fall below the voltage E2 for any reason, since the emitter of sensing transistor 12 is held at potential E2 from battery 10 via lead 19, the emitter of sensing transistor 12 is now more positive than the base and, transistor 12 conducts. Collector current which is limited to a desired value by resistor 18 flows via resistor 18 to the control electrode 20 of silicon controlled rectifier 13. The presence of current at control electrode 20 causes silicon controlled rectifier 13 to conduct providing a closed path for current flow between the base of switching transistor 11 and the negative terminal of battery 10 via resistor 16 and normally closed switch 17. Resistor 16 is of a value sufficient to limit the flow of current to the value necessary to produce saturation and prevent excess power dissipation in switching transistor 11. Once silicon controlled rectifier 13 conducts, the emitter of switching transistor 11 which is connected directly to the positive terminal of battery 10 becomes very much more positive than the base which is connected via silicon controlled rectifier 13 and resistor 16 to the negative terminal of battery 10. Saturation current flowing through switching transistor 11 provides a substantially short circuit condition. Under such circumstances, the positive terminal of battery 10 is effectively connected to terminal 5 via saturated switching transistor 11 and lead 8. The negative terminal of battery 10 is, of course, connected via lead 9 to terminal 6.

When the voltage E1 at terminals 5 and 6 is once again provided by rectifier and filter arrangement 2, or it is desired to turn the system off, normally closed switches 14 and 17 are actuated to remove the potential from the base of switching transistor 12, thereby turning transistor 12 off and opening the path through which the saturation current of switching transistor 11 flows. Switch 17 need only carry the base drive for switching transistor 11 and, depending upon the system requirements, could be buffered by more stages of gain so as to carry even less current. Switch 14, which may be ganged with switch 17, breaks a conduction path from battery 10 to load resistor 7 when the system is turned off.

Thus far, little has been said about resistor 15 which is connected between the phase and emitter of switching transistor 11. The presence of resistor 15 allows some additional operating features to be achieved. When the potential E1 from rectifier and filter arrangement 2 exceeds the potential of battery 10 by a volt or more, switching transistor 11 acts as a PNP transistor in the reverse direction. With resistor 15 present, the reversed emitter base junction (normally, the collector-base junction) becomes forward biased. Switching transistor 11 then acts as a constant current source for recharging battery 10. The current is determined by the reverse gain of transistor 11 and by the value of resistor 15. Resistor 15 serves also to reduce collector current at cutoff when the system is turned off.

From the foregoing, it should be clear that a switching circuit has been provided which is capable of extremely fast operation, provides sensing and power delivery by way of two terminals, acts to charge the battery when it falls below the voltage provided by the rectifier and filter arrangement, and provides means for affirmatively switching the system off making it superior to one in which only a diode is used for battery isolation.

In connection with the various transistors utilized, it should be appreciated that it is possible to substitute NPN transistors for the PNP devices shown. In any event, the sensing action of transistor 12 and the switching and latching action of transistor 11 remain substantially the same.

The following table 1 shows representative transistors, silicon controlled rectifiers, and voltage and resistance values which were successfully utilized in an experimental circuit.

TABLE I

| | |
|---|---|
| Voltage of Battery 10 | 10 v. (Nominal) |
| Characteristics Of | |
| Transistor 11 | Solitron DA3F3 |
| Transistor 12 | 2N3644 |
| S.C.R. 13 | G.E. C-15 |
| Resistance Of | |
| Resistor 15 | 47 Ω ½ w. |
| Resistor 16 | 10 Ω 20 w. |
| Resistor 18 | 470 Ω ½ w. |

While the invention has been particularly shown and described with reference to a preferred embodiment thereof, it will be understood by those skilled in the art that the foregoing and other changes in form and details may be made therein without departing from the spirit of the invention.

What is claimed is:

1. Apparatus for providing standby power comprising,
   a battery, a load, a source of rectified and filtered AC connected to said load,
   switching means interposed between said battery and said load,
   sensing means connected to said battery and said source of rectified and filtered AC for detecting a variation in the voltage of the latter from a giving level,
   means responsive to said sensing means connected to said switching means and said battery for connecting said battery to said load when the voltage from said source of rectified and filtered AC falls below said given level, and
   means including at least a portion of said switching means and a current limiting resistor serially disposed between said battery and said source of rectified and filtered AC for charging said battery while said load is connected to said source of rectified and filtered AC.

2. Apparatus for providing standby power comprising,
   a two-terminal load,
   a rectified AC source connected to said load,
   a battery equal in voltage to said given voltage one side of which is directly connected to one terminal of said two-terminal load,
   means including a saturable element normally nonconducting when said given voltage is supplied from said rectified AC source and conductive when said given voltage falls below said given value connected to the other side of said battery and to the other terminal of said two terminal load for isolating said source when said load is supplied from said rectified AC source, sensing means connected to said battery, said rectified AC source and said isolating means for detecting a variation in said rectified AC source, and means responsive to said sensing means connected to said isolating means to electrically connect said battery across said two terminal load when said given voltage falls below said given value.

3. Apparatus according to claim 1 wherein said switching means is a bipolar transistor.

4. Apparatus according to claim 1 wherein said sensing means is a bipolar transistor normally nonconductive when the base and emitter thereof are at substantially the same potential from said source of rectified and filtered AC and said battery and conductive when the emitter potential is different from the base potential.

5. Apparatus according to claim 1 wherein said means responsive to said switching means includes a controlled rectifier element which is normally nonconducting and rendered conductive by the flow of current through said sensing means.

6. Apparatus according to claim 1 wherein said at least a portion of said switching means is a forward biased PN-junction.

7. Apparatus according to claim 2 wherein said sensing means is a bipolar transistor normally nonconductive when said rectified AC source and said battery are at the same potential and conductive when said rectified AC source and said battery are at different potentials.

8. Apparatus according to claim 2 wherein said means responsive to said sensing means is a controlled rectifier element normally nonconducting when said sensing means is nonconducting and conductive when said sensing means is conductive.

9. Apparatus according to claim 2 further including means connected between said source of rectified AC and said battery to provide a trickle charge thereto when the potential of said source of rectified AC is greater than the potential of said battery.

10. Apparatus according to claim 2 further including means connected to said battery and to said sensing means for removing said battery from said load when said rectified AC source is reapplied to said load at said given voltage.

11. Apparatus according to claim 2 wherein said saturable element is a bipolar transistor.

12. Apparatus according to claim 7 wherein said rectified AC source and said battery at different potentials includes said rectified AC source being at a lower potential than said battery.

13. Apparatus according to claim 9 wherein said means for providing a trickle charge includes at least a portion of said isolating means in series with a current limiting resistor.

14. Apparatus according to claim 13 wherein said at least a portion of said isolating means is a forward biased PN-junction.

15. Apparatus according to claim 10 wherein said means for removing said battery from said load includes a normally closed switch serially connected with said battery and said means responsive to said sensing means and another normally closed switch in series with said sensing means both of which are ganged to operate simultaneously.

16. Apparatus for providing standby power comprising, a two-terminal load, a source of rectified and filtered AC connected to said load, a battery, the negative terminal of which is connected to one terminal of said two-terminal load, a saturable PNP-switching transistor, the collector of which is connected to the other of the terminals of said two-terminal load and the emitter of which is connected to the positive side of said battery, a PNP-sensing transistor, the base of which is connected to the collector of said switching transistor, the emitter of which is connected to the emitter of said switching transistor, a silicon controlled rectifier, one terminal of which is connected to the base of said switching transistor, a second terminal of which is connected via a current-limiting resistor to the negative side of said battery, the control electrode of said controlled rectifier being connected via a current-limiting resistor to the collector of said sensing transistor, said sensing transistor being operative when said rectified AC source falls below the voltage of said battery to turn on said silicon controlled rectifier and provide a current path via said switching transistor to connect said battery to said load.